Nov. 1, 1932.  C. E. RECORDS  1,886,121
WELL SCREEN
Filed Nov. 4, 1929   4 Sheets-Sheet 1
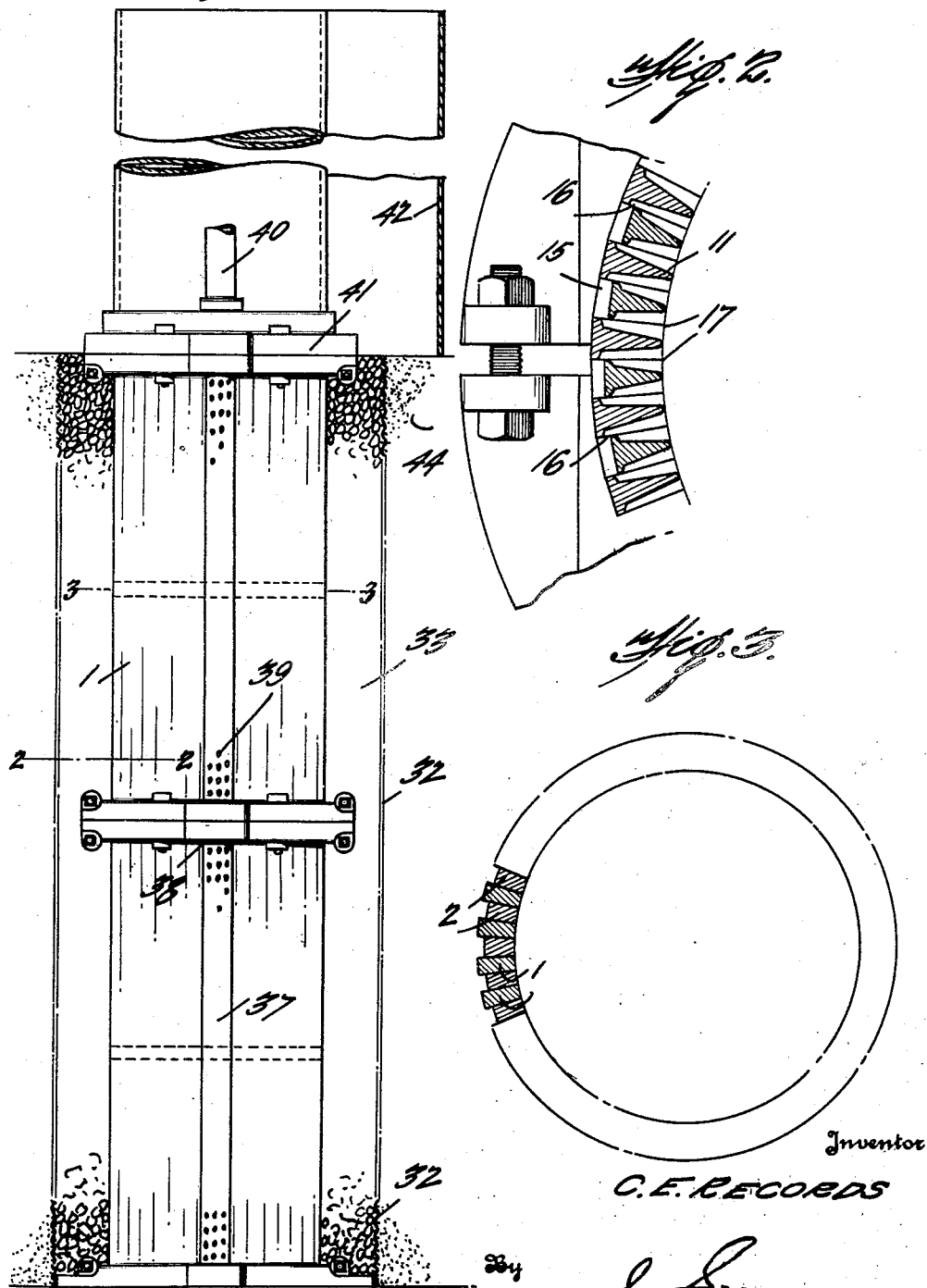

Nov. 1, 1932.  C. E. RECORDS  1,886,121
WELL SCREEN
Filed Nov. 4, 1929   4 Sheets-Sheet 2
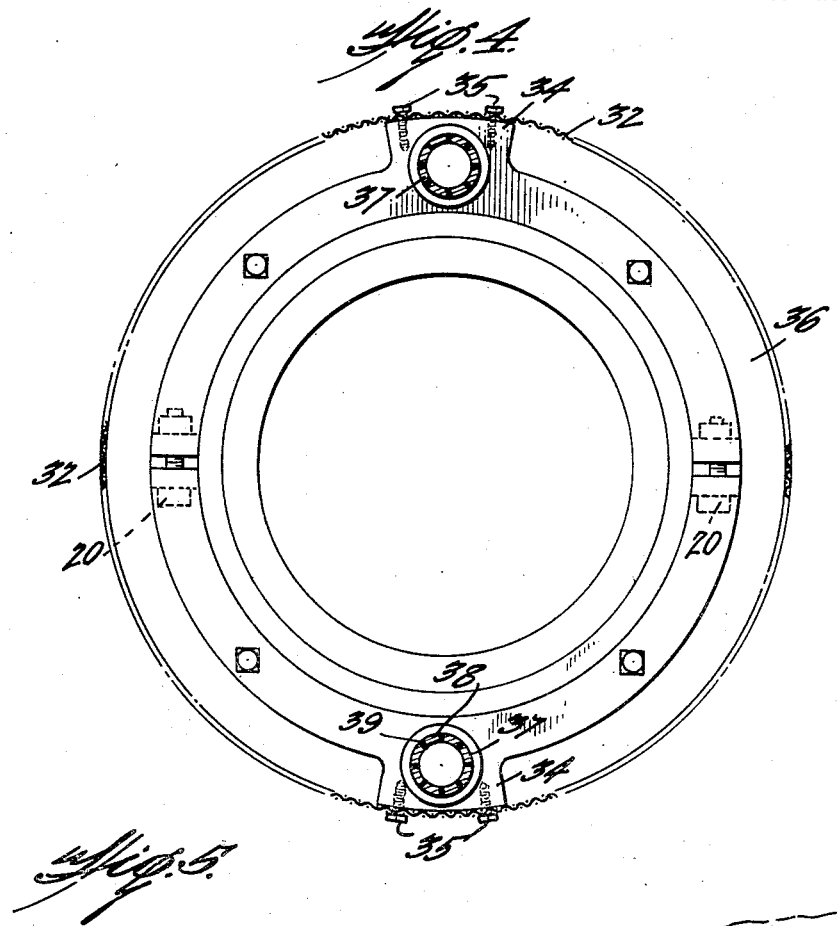
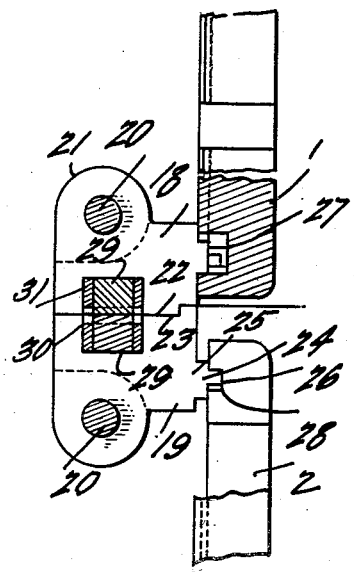
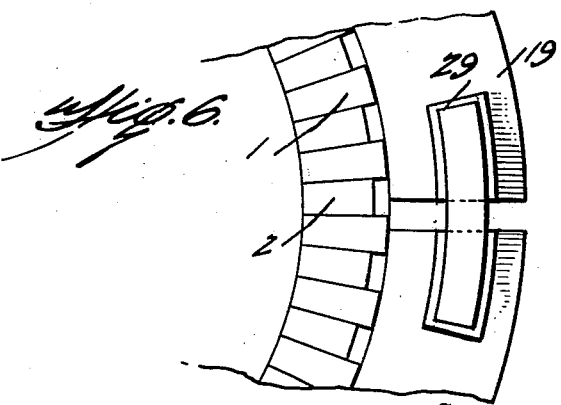
Inventor
C. E. RECORDS
By
Attorney Nov. 1, 1932.  C. E. RECORDS  1,886,121
WELL SCREEN
Filed Nov. 4, 1929   4 Sheets-Sheet 3
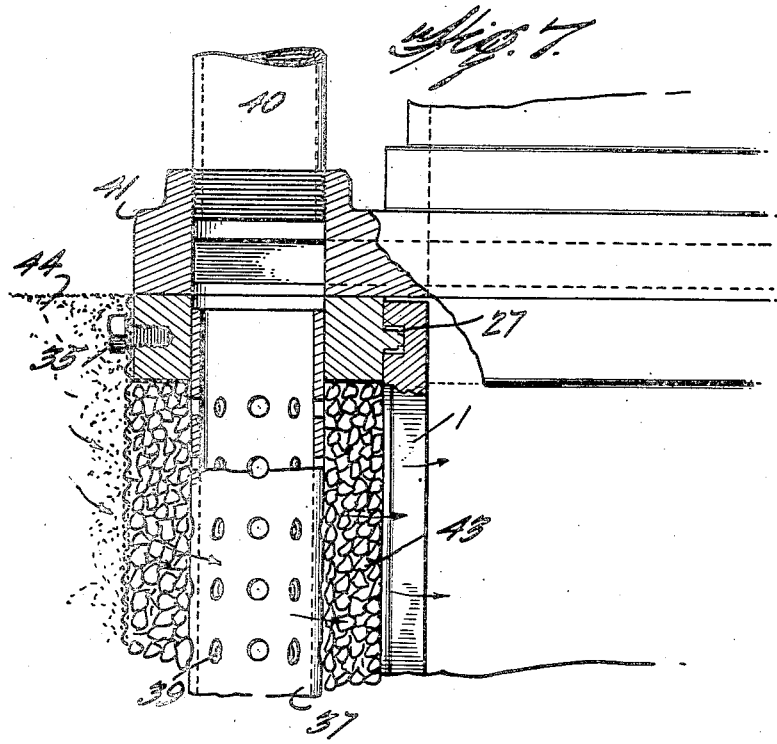
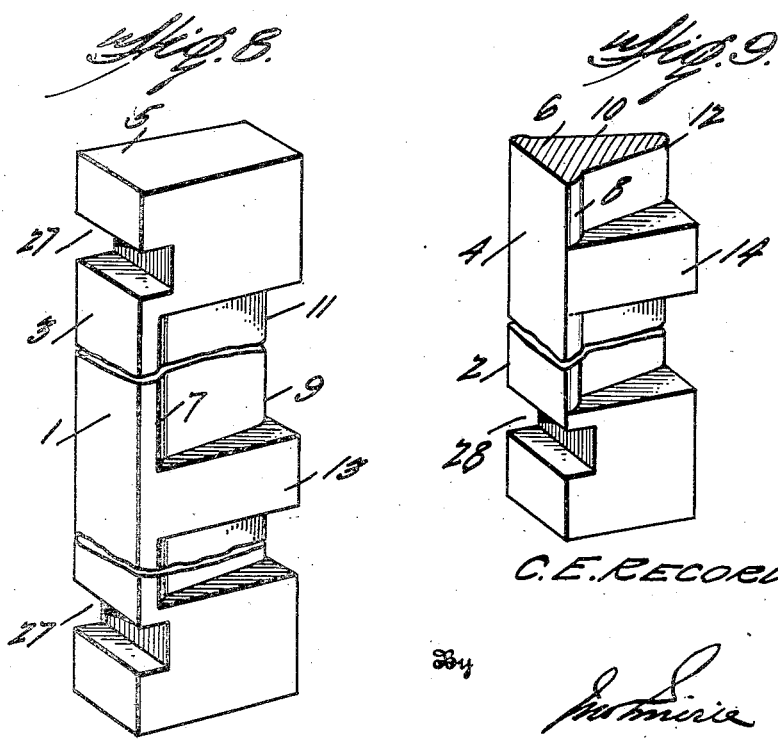
Inventor
C. E. RECORDS.
By
Attorney Nov. 1, 1932.  C. E. RECORDS  1,886,121
WELL SCREEN
Filed Nov. 4, 1929  4 Sheets-Sheet 4
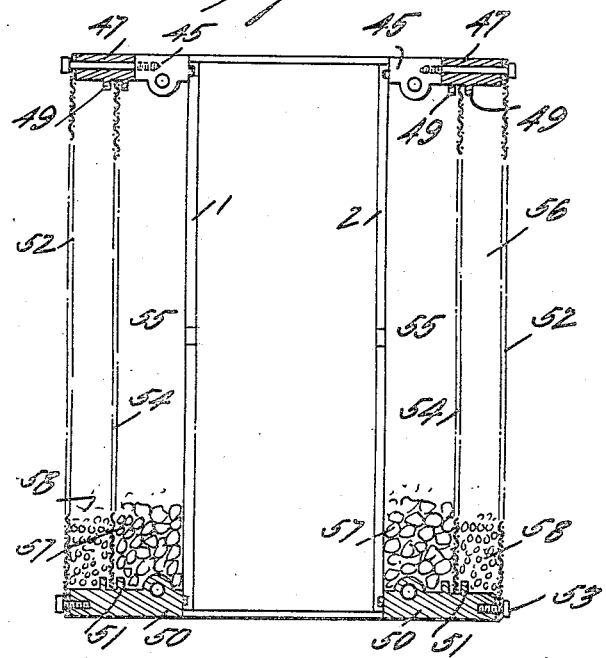
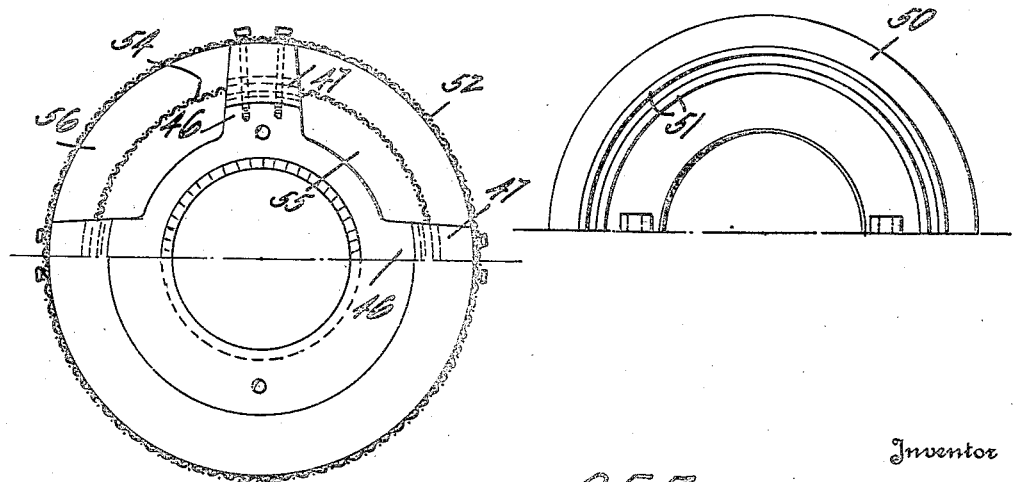

Patented Nov. 1, 1932

1,886,121

UNITED STATES PATENT OFFICE

CHESTER E. RECORDS, OF COLUMBUS, OHIO

WELL SCREEN

Application filed November 4, 1929. Serial No. 404,786.

This invention is directed to an improvement in well screens constructed with a view to an effective screening of the incoming fluid without material retardation of the flow incident to the screening operation.

In well construction, it is customary to employ a screen at the bottom of the well ordinarily surrounded by a graduated filtering medium in order to more or less separate the sand and other particles held in suspension in the water from the water before it enters the interior of the well. An effective screen must be of a type that will at all times present the maximum opening for the entrance of the water, with the water passages so constructed as to prevent any liability of their becoming choked by the filtering medium employed.

The primary object of the present invention, therefore, is the provision of a well screen made up of longitudinally ranging bars, each particularly formed to provide for the passage of water between them, with the alternate bars so relatively arranged as to insure against choking of the screen openings by the filtering medium.

A further object of the present invention is the provision of a screen conveniently designed for the application thereto of a woven wire mesh retaining wall held in spaced relation to the screen proper and designed to provide for the application of a particular stratum of filtering medium between the screen proper and woven wire mesh wall prior to the introduction of the screen into the well.

Well strainers as heretofore constructed, in at least a majority of the practical uses, have been made up of ring-like elements mounted in superimposed aligned relation and formed on their meeting faces with the water entrance openings. These rings have been found to be somewhat disadvantageous primarily in that they provided projections in the path of the dredging tool and a consequent liability of breakage during the use of the tool.

A further object of the present invention is the provision of a screen of this type made up of independent bars assembled in screen form, with the bars extending longitudinally of the screen to thereby avoid projections in the path of the dredging tool and thus minimizing any breakage incident to the dredging operation.

The invention is illustrated in the accompanying drawings, in which:

Figure 1 is a view in elevation, partly in section, showing the improved screen.

Figure 2 is a broken section on line 2—2 of Figure 1.

Figure 3 is a broken section on line 3—3 of Figure 1.

Figure 4 is a top plan of the screen proper.

Figure 5 is a broken vertical sectional view showing the retaining ring for holding the screen bars in place and illustrating particularly the means on such ring for maintaining the respectively adjacent bars in their proper relative positions.

Figure 6 is a broken plan view, partly in section, illustrating the relation of the ring and screen bars.

Figure 7 is an enlarged vertical sectional view illustrating more particularly the tube for feeding the acid or other cleaning fluid to the filtering medium.

Figure 8 is a perspective view of one of the screen bars.

Figure 9 is a similar view of another of the screen bars.

Figure 10 is a vertical section of the screen showing a modified form of construction.

Figure 11 is a broken top plan view of such modified form.

Figure 12 is a broken plan of the lower ring of such modified form.

The improved screen is made up of two sets of bars, hereinafter referred to as an outer bar 1 and an inner bar 2. In outline form, these bars are of somewhat similar form in outline, though different in size. These bars 1 and 2 are arranged in circumferential juxtaposition and form, when assembled, an annular wall defining the screen. The annular screen wall thus formed is to be designed, of course, to permit the passage of water therethrough while still functioning as a screen and the respective bars 1 and 2 are so formed that when associated to provide a screen wall, they will afford the maximum water opening between them as a direct result of the sectional form of each bar, the opening resulting from this formation being particularly designed to avoid choking or filling by the surrounding filtering medium.

The transverse sectional form or outline of the respective bars 1 and 2 is somewhat similar, differing, however, in the relation of the shoulders, as plainly seen in Figure 2. The relation of these shoulders and corresponding outline form parts of the respective bars is designed to avoid having any portion of the water inlet space between the bars formed with parallel walls, as the opening throughout in any particular length of such opening is preferably arranged so that the walls of such length are either converging or diverging.

The relatively outer faces 3 and 4 of the respective bars 1 and 2, instead of being curved coincident with the normal curvature of the wall of the screen, form a plain flat surface, the direction of which is tangent to the curve which would otherwise pass through the central radial line of the bar if the wall were curved. By this provision of a plain flat outer surface, the bars are constructed to permit a gang casting instead of the individual casting that would be required if the outer surface was curved to conform to the curvature of the screen. This is, of course, a manufacturing expedient leading to economy and while desirable and important, is not intended to indicate a particular limitation in connection with the form of this outer surface.

The outer portion of each of the bars 1 and 2 is, for an appreciable length of such bar considered radially of the screen, of a width which, considered circumferentially of the screen, is equal to that of the outer face; that is to say, each bar has an outer marginal portion 5 and 6 respectively which is equal in width to that of the outer face and of appreciable depth radially of the bar, this margin being hereinafter termed the head portion of the bar.

Inwardly of the head portion, each bar is formed with inwardly inclined shoulders 7 and 8 respectively, these shoulders being at a somewhat abrupt angle and their surfaces being either plain or rounded. At the inner terminal of the shoulders 7 and 8, the respective bars present converging surfaces 9 and 10 respectively, these converging surfaces being at an angle to the radial line of the bar and merging at their inner ends into more or less rounded narrow edges 11 and 12 respectively which define the inner surface of the screen.

At an appropriate point in its length and at each end, each bar is formed in sectional outline to present an area which is commensurate with the full circumferential space occupied by the bar; that is to say, each bar has a projection beyond each normal side wall 9 and 10 respectively, with such projections, indicated at 13 for the end projection and 14 for the intermediate projection, presenting abutments which will insure surface contact between the abutments in the radial arrangement of the bar. Thus, throughout the area of the abutments, the side walls of the bars are in actual contact, thus serving to position the bars relative to each other and insuring that the inward pressure of the surrounding filtering medium will more or less assist in holding the bars in their proper circumferential relation to provide the desired screen wall.

As previously stated, the radial length of the outer bar 1 is greater than that of the inner bar 2 and through the medium utilized for holding the bars in position, as will later appear, the bars are held with their inner edges 11 and 12 in circumferential alignment, as indicated in Figure 2, and it is apparent that the outer faces 3 and 4 of the respectively adjacent bars are disposed in offset circumferential planes. As the bars 1 and 2 alternate in making up the screen wall, it is thus apparent that so far as the outer surface of the screen is concerned, it is made up of spaced outer margins defined by the faces 3 of the bars 1 and intermediate and radially inset margins defined by the outer faces 4 of the bars 2. Of course, in this arrangement the abutments 13 and 14 are in contact and maintain the formed surfaces of the bars above and below the abutments in proper spaced relation to provide the screen openings.

As will be clear from Figure 2, it is apparent that through the relative radial dimensions of the bars, the outer faces 4 of the bars 2 are disposed inwardly, radially considered, of the shoulders 7 of the bars 1. Thus, there is a vertical space 15 in the outer surface of the screen between each of the bars 1, which space communicates with passages 16 which are directed almost circumferentially of the wall of the screen and are defined by the outer faces 4 of the bars 2 and the shoulders 7 of the bars 1. The space 16 communicates with the inwardly directed and continually increasing channels 17 defined by the walls 9 of the bars 1 and the walls 10 of the bars 2, these channels 17, by reason of the inclination of the walls defining them, being of increased area inwardly of the screen wall. It will thus be seen that the channels are nowhere defined by parallel walls but in every instance by either converging or diverging walls, thereby facilitating the passage of the water without liability of choking these channe's.

It is, of course, to be understood that the bars 1 and 2 extend longitudinally, that is vertically, of the screen and that it is essential that means be provided for uniting the upper and lower ends of these bars, particularly where a plurality of sets of bars are associated in endwise relation to form a screen having a length greater than that of any one integral bar. In assembling the bars to make up a screen including more than one length of bar, there is provided upper and lower semicircular ring sections 18 and 19. These ring sections, which are associated in superimposed relation to provide a holding ring, are semicircular in form and are connected through the medium of bolts 20 passing through offset ears 21 in each ring section, so that each half of each ring section may be united into a more or less clamping ring by suitable tightening of the bolts.

The contacting faces of the respective ring sections are formed for mating cooperation; that is to say, one of the sections will be formed with a projection 22 to seat in a depression 23 in the other section to prevent lateral separation of the sections. Each section is formed for cooperation with each bar and for this purpose each ring section is formed on its inner vertical edge, in proper relation to cooperate with the bars, with a projection 24. This projection is particularly formed to cooperate with either the outer bars 1 or inner bars 2 and in that cooperation to hold the respective bars in their proper radially offset relation; that is to say, each projection 24 is formed with a comparatively wide portion 25 immediately adjacent the inner edge of the bar and with a narrower portion 26 projecting from the inner marginal edge of the wider portion 25. The depth, considered radially, of the ring of the wider projection 25 is equal to the distance of radial offset of the respective bars in assembled relation.

The outer face of the respective bars in that portion with which the ring cooperates are formed with recesses, the outer face 3 of the bar 1 being formed with a recess 27 to more or less accurately receive the wider projection 25, while the outer face 4 of the bar 2 is formed with a recess 28 to more or less accurately receive the narrower projection 26. Thus, when the bars are associated with the holding rings, the outer face 3 of the bar 1 will bear snugly against the inner face of the ring, while the outer face 4 of the bar 2 is held in inwardly spaced relation from the outer face of the ring, thus insuring the radially offset spacing of the bars necessary to provide the proper water channels and as shown in Figure 2.

Experience having demonstrated that the acid used in cleaning the well might eventually destroy the bolts 20, at least so far as effective holding is concerned, it is found necessary and advisable to further unite the meeting ends of the ring sections to avoid separation of such sections in the event the bolts should be destroyed. To secure this result, the meeting faces of the respective ring sections are formed with recesses 29 opening through the meeting faces and through the end walls of the sections. These recesses, when the meeting faces are assembled, form a closed channel in which is seated a bar 30 fixed in place by solder or other holding medium 31, with the bar 30 of a material not affected by the acid, so that the bar will serve to hold the sections in ring-forming relation, notwithstanding the failure of the bolts.

It is a characteristic feature of the present screen that means may be associated with the screen proper for assembling the innermost filtering medium, immediately surrounding the screen proper, prior to the introduction of the screen into the well. These filtering mediums, usually in the form of large pebbles and the like, are arranged to surround the bars of the screen and form the innermost filtering medium for the incoming water. To provide for this application of the filtering medium, a cylindrical body 32 is arranged to be connected to the screen proper and supported thereby. This cylindrical body, which may be of appropriate woven material, is of course of greater diameter than the external diameter of the screen proper, providing a space 33 between such screen proper and the cylindrical body for the reception of the filtering medium.

To provide for connecting this cylindrical body, the lower and upper rings are formed with diametrically opposed external projections 34 over which the cylindrical body 32 is fitted and to which it is removably secured by bolts or other fastenings 35. The bottom ring of the screen proper is extended to form a ledge or flange 36 which closes the bottom of the cylindrical body, so that when the parts are assembled, there is formed between the cylindrical body and the screen proper an annular space of predetermined radial dimensions in which the desired filtering medium may be introduced before the screen is lowered into the well.

As previously stated, the accepted method now generally practiced of cleaning the filtering medium is by the introduction of acid from the top of the well into such medium to destroy the material accumulated between the filtering medium in the passage of the water therethrough. The present screen lends itself most conveniently to the provision of means for introducing this cleansing acid into the filtering medium without the necessity of withdrawing the pump or otherwise disturbing any of the parts of the pumping assembly.

For this purpose, the projections 34 to which the filtering medium holding cylindrical element 32 is secured are formed for the reception of pipes 37, as at 38, the upper and intermediate rings having openings 38 through which the pipes may be passed and in which they are held against lateral displacement, while the lower ring is formed with a blind opening in which the lower end of the pipe is seated and in which it may be removably secured in any desired manner. The pipe 37 within the range of the screen proper is formed with openings 39 through which the acid may be delivered to the filtering medium. The upper ring of the screen proper is formed for the reception of a pipe 40 which may extend to the top of the well for the introduction of the acid. The upper ring of the screen is also formed with a cored circumferential passage 41 with which the lower end of the pipe 40 communicates to provide for the connection of other acid delivery tubes where such may be found necessary. It is of course to be understood that the upper and lower rings of the screen are formed for the reception of these additional pipes, so that a plurality of pipes for the acid or other treating material may be disposed within the screen proper and all of these pipes served by a single delivery pipe leading to the top of the well, as at 40.

The bars 1 and 2 of the screen proper extend longitudinally of the screen and thus form a clear, uninterrupted passage for the movement of the dredging tool and avoiding the possibility of such tool engaging any portion of the screen, thus avoiding the liability of breakage. The material of the screen parts are preferably constructed of material which will not be affected by the acid, for example of cast iron, though obviously other non-corroding metals may be used.

The material of the cylindrical mesh element 32 for holding the filtering medium is wholly unimportant; in fact, this element is primarily designed to facilitate the introduction of the filtering medium into the well with the screen in order that such filtering medium may be of proper radial depth and properly encircle the screen. It is wholly unimportant as to whether or not this filtering medium holding element remain intact in the well; in fact, it is rather desirable that it be destroyed to avoid interference. Hence it is preferred that this filtering medium holding element be of a material which will readily rust away or be destroyed by the cleaning chemicals though this is not an essential feature of the present invention.

In forming the well, the well casing 42 may be sunk to the desired depth and the well, through the water-bearing sand, will be constructed by commonly known methods, such as the rotary seal process or by drawing the casing 42 back for the desired distance. After the screen with its encircling filtering medium of comparatively large pebbles, indicated at 43, is lowered into the well, a wall of smaller pebbles 44 is introduced exteriorly of the cylindrical element 32. As the water goes from the layer of fine sand, it passes through the filtering medium pebbles 44, then through the larger pebbles 43 and then through the screen, so that the interstices of the filtering medium and screen increase in size as the velocity of the incoming water increases. The openings in the screen being vertical and extending practically throughout the entire length of the screen, afford a maximum amount of space through which the water can flow and the space 15 formed by the relatively different radial lengths of the respectively adjacent bars forms a pocket for receiving the water with the minimum amount of interference from the filtering medium pebbles 43. There is thus formed an effective filtering of the incoming water without the liability of the filtering medium choking or interfering with the free passage of the water through the screen proper.

The improved screen, when constructed as described, provides the maximum water inlet opening with least liability of choking by the surrounding filtering mediums; avoids any possible obstruction to the movement of the dredging tool by reason of the longitudinal disposition of the bars making up the screen; provides as an assembled part of the screen a medium through which the acid or other cleaning chemical may be readily introduced into the filtering medium without withdrawing the pump assembly; and provides a means by which the filtering medium immediately surrounding the screen may be assembled with the screen before the lowering of the latter into the well.

Of course, the screen may be made of any length by the use of the rings described for connecting the adjacent ends of the screen bars, and when so associated, the screen proper, no matter what its length, is a comparatively rigid association of parts which may be introduced into and withdrawn from the well as a unit, with practically no liability of obstruction or interference.

In Figures 10, 11 and 12 there is illustrated a modification of the construction previously described in that provision is made in which the screen may be made to accommodate the use of surrounding areas of filtering elements of two different sizes. This of course necessitates the provision of an additional element for maintaining the one filtering medium separated from the other during the arrangement of these filtering mediums about the screen. To secure this result, the upper ring, here indicated at 45, is similar to the upper ring of the preferred form except that it is formed with radial offsets 46 to which blocks 47 may be removably secured, as by threaded rods or screws 48. These blocks are formed on their lower surfaces with spaced ribs 49 arranged in a plane concentric with the axis of the ring.

The lower ring 50, otherwise identical with the lower ring of the preferred form, is also provided or formed with annular ribs 51 concentric with the axis of the screen and, when the screen is assembled, disposed in vertical alignments with the ribs 49 of the blocks 47. The outer filtering medium retaining body, which is in the form of a woven mesh cylinder 52, is secured at its respective ends to the blocks 47 and to the lower ring 50, the screws or threaded rods 48 serving to hold the upper end of the woven mesh cylinder while the lower end is secured by screws 53, as in the preferred form. An intermediate cylinder 54 is, in the modified form, arranged inwardly of and in spaced relation to the mesh cylinder 52, the upper edge of the mesh cylinder 54 being held between the ribs 49 of the blocks 47 while its lower edge is held between the ribs 51 of the lower ring 50.

As thus arranged, the respective concentric mesh cylinders provide spaces 55 and 56 surrounding the screen proper, the space 55 being designed for the reception of filtering medium in the form of large pebbles, as indicated at 57, while the space 56, which is that included between the mesh cylinders 52 and 54, is designed for the reception of a filtering medium in the form of smaller pebbles, indicated at 58. The upper ends of the respective mesh bodies are, except for the blocks 47 and radial projections 46, fully open to permit the introduction of these pebbles.

Distinctive layers of filtering medium involving two different sizes of pebbles may thus be arranged to surround the screen proper prior to the introduction of the screen into the well, and following this introduction it is of course apparent that the respective filtering areas will remain substantially intact and it is therefore immaterial as to whether the mesh cylinders are eventually destroyed by corrosion or otherwise.

It is of course apparent that the inner mesh body is only important for the purpose of maintaining the division of the respective filtering mediums during their application and that if it is desired to remove this screen body 54 prior to the introduction of the screen into the well, it will not be necessary to arrange the blocks 47 in place until just prior to the introduction of the screen into the well, for the application of the respective mesh bodies 52 and 54 will be held by the lower ring in appropriate spaced relation, and after the introduction of the filtering mediums of different sizes, the inner mesh cylinder 54 may be merely lifted from its position on the lower ring and withdrawn, as the outer mesh body 52 and the layer of smaller pebbles inwardly of this mesh body will hold the layer of larger pebbles in place. After the withdrawal of the mesh body 54, if desired, the blocks 47 may be secured in place and the upper end of the mesh body 52 secured to such block in order to maintain the assembly intact during the handling of the screen.

What is claimed to be new is:

1. A well screen including vertically arranged bars assembled in circumferential relation and in partial contact to form a single cylindrical screen wall bars being respectively formed beyond the points of contact to provide a water passage between them, certain of the bars being horizontally offset with respect to the remaining bars to provide water receiving pockets in the outer surface of the screen.

2. A well screen made up of vertically disposed bars associated to form an annular screen wall, said bars being spaced apart throughout the greater portion of their lengths to provide water passages, the remaining portions of each of the bars being projected beyond those portions defining the water passages to provide contacting parts to hold the bars in spaced position and in circumferential relation, certain of the bars being horizontally offset with respect to the remaining bars to provide water-receiving pockets in the outer surface of the screen.

3. A well screen made up of vertically arranged bars, each formed to present flat outer faces and converging inner walls, each of the bars being formed with contacting abutments serving to maintain the converging inner walls above and below the abutments in spaced relation, certain of the bars being horizontally offset with respect to the remaining bars to provide water-receiving pockets in the outer surface of the screen.

4. A well screen made up of vertically arranged bars in circumferential alignment to form an annular wall, each of the bars being formed with abutments in contact, the bars above and below the abutments presenting converging side walls and plain outer faces, the inner faces of the bars being in substantially circumferential alignment, the outer faces of the bars being in offset circumferential planes to provide water receiving pockets.

5. A well screen made up of vertically arranged bars formed at appropriate and similar points with contacting abutments, the bars being disposed in circumferential alignment to provide an annular wall, said bars between the abutments being spaced apart to provide water passages, certain of the bars being of less radial length than the remaining bars to form water pockets in the outer surface of the screen.

6. A well screen made up of vertical bars associated and formed to provide water passages between them, rings uniting the meeting ends of the bars, said rings being formed with inwardly extending projections to seat in recesses in the bars, the respective projections and recesses being formed to offset certain of the bars with respect to the remaining bars to form pockets in the outer surface of the screen.

7. A cylindrical well screen made up of vertical bars in radial arrangement, the bars being formed and associated to provide water passages between them, a ring uniting the meeting ends of the bars, said ring being formed with means to interfit with the bars and being constructed of semicircular superimposed sections, means for clamping the sections together, and bars seating in recesses in the meeting ends of the sections to unite the sections against displacement.

8. A cylindrical well screen made up of circumferentially disposed bars formed with water passages between them, certain of the bars being offset with respect to the remaining bars to form water pockets in the outer surface of the screen, rings uniting the meeting ends of the bars, and a cylindrical element secured to the rings in spaced relation to the bars to provide for the reception of a filtering medium to directly overlie the water pockets.

9. A cylindrical well screen made up of vertically arranged bars arranged in circumferential relation and formed to provide water passages between them, certain of the bars being offset with respect to the remaining bars to form water pockets in the outer surface of the screen, and rings uniting the meeting ends of the bars, said rings being formed beyond the bars for the reception of a perforated pipe to distribute cleaning chemicals into the space outside the bars.

10. A cylindrical well screen made up of vertical bars in radial arrangement, said bars being formed to provide water channels between them and relatively disposed to provide water pockets in the outer surface of the screen, a cylindrical element secured to and carried by the bars and spaced therefrom for the reception of a filtering medium, and a chemical distributing pipe connected to and movable with the bars and extending longitudinally of the screen between the bars and said cylindrical element.

11. A bar for the formation of well screens, comprising an appropriate length of solid material presenting a flat outer face, inwardly extending shoulders inwardly of such face, and inwardly converging walls inwardly of the shoulders, each of said bars having abutments spaced longitudinally thereof between sections of the inwardly converging walls, each abutment having a dimension substantially equal to the transverse dimension of the outer face throughout the transverse length of the inwardly converging walls of the bar.

12. A cylindrical well screen including radially disposed bars formed with water passages between them, rings uniting the bars, a plurality of mesh filtering medium supporting elements encircling the bars, and means carried by the rings for securing the respective filtering medium supporting elements in concentric spaced relation.

In testimony whereof I affix my signature.

CHESTER E. RECORDS.